United States Patent [19]
Okamoto

[11] Patent Number: 5,448,745
[45] Date of Patent: Sep. 5, 1995

[54] DATA FLOW PROCESSOR WITH SIMULTANEOUS DATA AND INSTRUCTION READOUT FROM MEMORY FOR SIMULTANEOUS PROCESSING OF PAIRS OF DATA PACKETS IN A COPY OPERATION

[75] Inventor: Toshiya Okamoto, Kyoto, Japan

[73] Assignee: Sharp Kabushiki Kaisha, Osaka, Japan

[21] Appl. No.: 161,086

[22] Filed: Dec. 3, 1993

Related U.S. Application Data

[63] Continuation of Ser. No. 659,690, Feb. 25, 1991, abandoned.

[30] Foreign Application Priority Data

Feb. 27, 1990 [JP] Japan ................................. 2-49051
May 24, 1990 [JP] Japan ................................. 2-134782

[51] Int. Cl.$^6$ .......................................... G06F 15/82
[52] U.S. Cl. .............................. 395/800; 364/DIG. 1; 364/232.22; 364/254.2
[58] Field of Search .............................. 395/800, 375

[56] References Cited

U.S. PATENT DOCUMENTS

| | | | |
|---|---|---|---|
| 3,962,706 | 6/1976 | Dennis et al. | 395/650 |
| 4,145,733 | 3/1979 | Misunas et al. | 395/725 |
| 4,149,240 | 4/1979 | Misunas et al. | 395/800 |
| 4,153,932 | 5/1979 | Dennis et al. | 395/800 |
| 4,814,978 | 3/1989 | Dennis | 395/375 |
| 4,965,715 | 10/1990 | Yoshida | 395/375 |
| 5,043,880 | 8/1991 | Yoshida | 395/375 |

OTHER PUBLICATIONS

"Collected Papers on the Lectures of 34th National Conference of Information Processing Society" pp. 237–240, partial translations.

*Primary Examiner*—Parshotam S. Lall
*Assistant Examiner*—Richard L. Ellis

[57] ABSTRACT

A data pair detecting portion of a data flow type information processor outputs a data packet including a destination field and an instruction field and a data packet including two data fields. The data packet including the destination field and the instruction field is separated into a data packet including the destination filed and a data packet including the instruction field. The data packet including the destination field is applied to a program storing portion and the data packet including the instruction field is applied to an operation processing portion. The data packet including the two data fields is also applied to the operation processing portion. In a copy processing or in a constant reading processing, the program storing portion outputs a further data packet including a destination field and an instruction field or a data packet including a constant simultaneously with a data packet including a destination field and an instruction field. The operation processing portion outputs a data packet including a data field indicative of an operation result. The data packets output from the program storing portion and the data packet output from the operation processing portion are applied in parallel to a data pair detecting portion.

14 Claims, 10 Drawing Sheets

DATA FLOW PROCESSOR WITH SIMULTANEOUS DATA AND INSTRUCTION READOUT FROM MEMORY FOR SIMULTANEOUS PROCESSING OF PAIRS OF DATA PACKETS IN A COPY OPERATION

This application is a continuation, of application Ser. No. 07/659,690 filed on Feb. 25, 1991, now abandoned.

CROSS-REFERENCE TO RELATED APPLICATION

This application is related to application Ser. No. 490,411, filed Mar. 8, 1990, now abandoned commonly assigned with the present invention.

BACKGROUND OF THE INVENTION

1. Field of the Invention

The present invention relates generally to data flow type information processors, and more particularly, data flow type information processors for executing data flow program including instructions for performing a numerical value operation processing or a logical operation processing with respect to two data and a processing method therefor.

2. Description of the Background Art

In a conventional von Neuman type computer, various instructions are stored in advance as program in program memories, and addresses in the program memories are sequentially designated by a program counter, so that the instructions are sequentially read out to he executed.

On the other hand, a data flow type information processor is one type of non-von Neuman type computers having no concept of sequential execution of instructions by a program counter. Such a data flow type information processor employs architecture based on a parallel processing of instructions. In the data flow type information processor, immediately after data which are objects of an operation are collected, an instruction becomes executable and a plurality of instructions are simultaneously driven by the data, so that program is executed in parallel in accordance with the natural flow of the data. As a result, it is considered that the time required for the operation is significantly reduced.

FIG. 16 is a block diagram showing one example of a structure of a conventional data flow type information processor. FIG. 17 is a diagram showing one example of a field arrangement of a data packet to be processed by the information processor.

A data packet 60 shown in FIG. 17 includes a destination field 61, an instruction field 62, a data 1 field 63, and a data 2 field 64. The destination field 61 stores destination information, the instruction field 62 stores instruction information, and the data 1 field 63 or the data 2 field 64 stores operand data.

The information processor shown in FIG. 16 includes a program storing portion 1, a data pair detecting portion 2 and an operation processing portion 3. The program storing portion 1 stores data flow program 70 shown in FIG. 18. The program storing portion 1 reads, as shown in FIG. 18, destination information 71, instruction information 72 and copy presence/absence information 73 of the data flow program 70 by addressing based on the destination information of data packet 60 applied as an input, stores the destination information 71 and the instruction information 72 in the destination field 61 and the instruction field 62 of the data packet 60, respectively, and outputs the data packet 60.

The data pair detecting portion 2 queues the data packets 60 supplied from the program storing portion 1 as outputs. More specifically, the data pair detecting portion 2 detects two different data packets having the same destination information, stores operand data of one of the data packets 60, for example, the contents of the data 1 field 63 shown in FIG. 17, in the data 2 field 64 of the other data packet 60, and outputs the other data packet 60. The operation processing portion 3 performs an operation processing based on the instruction information with respect to the data packet 60 output from the data pair detecting portion 2, stores the result of the operation processing in the data 1 field 63 of the data packet 60, and outputs the data packet 60 to the program storing portion 1.

The program storing portion 1 and the data pair detecting portion 2 are coupled to each other by a data transmission path 4. The data transmission path 4 is branched into two and coupled to two input ports of the data pair detecting portion 2. A data packet 60 output from the program storing portion 1 is selectively applied as an input to either of the input ports of the data pair detecting portion 2 in response to the operand data being right operand data or left operand data in the operation processing. In addition, the data pair detecting portion 2 and the operation processing portion 3 are coupled to each other by a data transmission path 5 and the operation processing portion 3 and the program storing portion 1 are coupled to each other by a data transmission path 6.

As the data packets 60 continues to circulate through the program storing portion 1, the data pair detecting portion 2, the operation processing portion 3 and the program storing portion 1, the operation processing proceeds in accordance with the data flow program 70 stored in the program storing portion 1.

Now consider a case where data should be copied in the data flow program 70 to be executed, as shown in FIG. 19. That is, in a case where an operation result, for example, an output of an instruction of addition in FIG. 19 is referred to by two or more of other operations, for example, instructions of multiplication and subtraction in FIG. 19, a copy processing is performed in the program storing portion 1.

The contents of a portion addressed based on the destination information of the applied data packet 60 are first read out from the data flow program 70. At this time, if the copy presence/absence information 73 indicates "absence", the data packet 60 is output with the contents of its destination field 61 and instruction field 62 updated, whereby the processing is completed.

Conversely, if the copy presence/absence information 73 indicates "presence", the data packet 60 is output with its contents of the destination field 61 and the instruction field 62 updated, and the subsequently stored destination information 71, instruction information 72 and copy presence/absence information 73 are read out. If the subsequently read out copy presence/absence information 73 indicates "absence", the data packet 60 is output which stores the same data as that of the input data packet 60 in the data 1 field 63 thereof and stores the destination information 71 and the instruction information 72 which have been read out just now in the destination field 61 and the instruction field 62 thereof,respectively, whereby the processing is completed. If the consequently read out copy presence/absence information 73 indicates "presence", the same copy processing will be further repeated.

In the above described information processor, once the copy processing is performed, a flow ratio of the data packets 60 on the transmission path 6 for the input of the program storing portion 1 to the data packets on the transmission path 4 for the output from the program storing portion 1 becomes 1:2 without fail. Here, the flow ratio of the data packets is a ratio of the number of the data packets passing through these transmission paths per hour.

FIG. 20 shows a flow rate of data packets 60 on each transmission path, assuming that the flow rate of the data packets 60 on the transmission path 4 is 1. The data pair detecting portion 2 outputs one data packet 60 in response to an input of two data packets 60. Therefore, even if it is assumed that the transmission path 4 operates at its largest capacity, only the half of a flow rate of its highest capacity can be obtained on and after the transmission path 5.

As the foregoing, in a copy processing at the program storing portion 1, the transmission paths 5 and 6 operate at only a half the largest capacity thereof. The operation processing portion 3 also operates at half its potential, accordingly, thereby deteriorating the reduction in the performance of the above described information processor during the execution of the program.

FIG. 21 is a block diagram showing another example of a structure of the conventional data flow type information processor.

The information processor of FIG. 21 is provided with two program storing portions 11 and 12. Each of the data packets output from the operation processing portion 3 is applied as an input to either of the program storing portions 11 or 12 through an allotting portion 13. The operation processing portion 3 and the allotting portion 13 are coupled to each other by a data transmission path 6. The allotting portion 13 is coupled to the program storing portions 11 and 12 through data transmission paths 16 and 17, respectively. Furthermore, the program storing portions 11 and 12 are individually coupled to the data pair detecting portion 2 through data transmission paths 14 and 15, respectively.

Functions of the respective portions of the information processor shown in FIG. 21 are completely the same as those of the respective portions of the information processor shown in FIG. 16. The allotting portion 13 allots the data packets output from the operation processing portion 3 to either of the program storing portions 11 or 12 in the order of arrival.

FIG. 22 shows a flow rate of data packets on each transmission path on the assumption-that both of the flow rates of the data packets on the transmission paths 14 and 15 are 1.

In the information processor of FIG. 21, since the allotting portion 13 allots the inputs of the data packets to the program storing portions 11 and 12, the program storing portions 11 and 12 receive the data packets at a rate half the largest capacity. When the copy processing is performed at the program storing portions 11 and 12, the flow rate of the data packets output from the program storing portions 11 and 12 onto the data transmission paths 14 and 15 doubles the flow rate of the data packets applied as inputs to the program storing portions 11 and 12 through the data transmission paths 16 and 17. That is, a flow rate at its largest capacity can be obtained on each of the transmission paths 14 and 15 for inputting the data packets to the data pair detecting portion 2. In addition, a flow rate at its largest capacity can be obtained also on the transmission path 5 for the data packets output from the data pair detecting portion 2, that is, the transmission path 5 for the data packets applied as inputs to the operation processing portion 3.

Accordingly, in the conventional information processor of FIG. 21, the performance of the operation processing portion 3 is enhanced to the maximum, so that theoretically, the effect of the parallel processing can be doubled as compared with the conventional information processor of FIG. 16.

The data flow type information processors shown in FIGS. 16 and 21 are disclosed in, for example, the article entitled "Examinations (1) and (2) on System Structure of Data Driven Type Processor" by Okamoto et al., *Collected Papers on the Lectures of 34th National Conference (the first half of 1987) of Information Processing Society*, pp. 237–240.

As the foregoing, in order to enhance efficiency of processing by the above described data flow type information processor shown in FIG. 16, a data flow type information processor has been developed which comprises a doubled program storing portion as shown in FIG. 16.

However, since the data flow type information processor shown in FIG. 21 comprises the doubled program storing portion, the entire storage capacity of the program storing portion doubles that of the processor shown in FIG. 16. As a result, the information processor itself is made larger in scale.

Furthermore, since the data packets which circulate through the processing portions in the information processor in the order of execution of the data flow program stored in the program storing portion are always processed in the pattern shown in FIG. 17, data lines (the data transmission paths) connecting the respective processing portions are unnecessarily wide.

More specifically, reading of the data flow program from the program storing portion essentially requires only the contents in the destination field 61 of the data packet 60 which specify the subsequent instruction information but not the contents of the instruction field 62, the data 1 field 63 and the data 2 field 64 of the data packet 60. In addition, the operation processing portion also requires the contents of the instruction field 62, the data 1 field 63 and the data 2 field 64 of the data packet 60, but not the contents of the destination field 61 of the data packet 60, which results in a physically wasteful use of the structure of the information processor.

SUMMARY OF THE INVENTION

An object of the present invention is to make a data flow type information processor smaller in scale without deteriorating its performance.

Another object of the present invention is to provide a compact data flow type information processor in which performance of each processing portion is not deteriorated even when a plurality of pieces of information are read from a program storing portion such as in a copy processing or a constant reading processing, and an operating method thereof.

A further object of the present invention is to provide a data flow type information processor which can be physically made smaller in scale by forming data packets circulating through processing portions out of the minimum information required for each processing portion.

The data flow type information processor according to the present invention includes a program storing portion, an operation processing portion, a merging portion, a data pair detecting portion and a supply portion.

The program storing portion stores data flow program and reads at least the subsequent destination information and instruction information from the data flow program based on the input destination information. The operation processing portion executes an operation processing with respect to input data based on the input instruction information, and outputs data indicating the operation result. The merging operation couples the destination information and the instruction information read out from the program storing portion with the data output from the operation processing portion. The data pair detecting portion receives the destination information and the instruction information output from the merging portion together with the data corresponding to those information and outputs one or a plurality of data corresponding to the same destination information together with the destination information and the instruction information. The supply portion supplies the destination information of the output from the data pair detecting portion to the program storing portion, and supplies the instruction information and the data to the data processing portion.

When other information is read simultaneously with the destination information and the instruction information from the program storing portion, the merging portion applies said other information to the data pair detecting portion in parallel with the destination information and the instruction information.

According to one aspect of the present invention, the supply portion may be a branch portion which selectively outputs destination information out of the output from the data pair detecting portion to the program storing portion or to the outside and selectively outputs instruction information and data to the operation processing portion or to the outside.

According to another aspect of the present invention, the information processor may further include a branching portion which selectively outputs the destination information and the instruction information read from the program storing portion and the data output from the operation processing portion to the merging portion or to the outside. In addition, the supply portion may be a transmission path which supplies destination information out of the output from the data pair detecting portion to the program storing portion and supplies instruction information and data to the operation processing portion.

In this information processing apparatus, the supply portion separates destination information from instruction information and data, and the merging portion couples the separated destination information, instruction information and data, thereby transmitting the minimum information to each processing portion. Therefore, a width of a data line (data transmission path) connecting the respective processing portions can be reduced.

In addition, in the information processor, even if other information is read simultaneously with destination information and instruction information from the program storing portion, the merging portion supplies those pieces of information to the data pair detecting portion in parallel. It is therefore possible to couple the separated destination information with the corresponding instruction information and data without applying additional identification information to the separated destination information and instruction information.

It is therefore possible to reduce a packet size and a chip area of a large-scale integrated information processor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
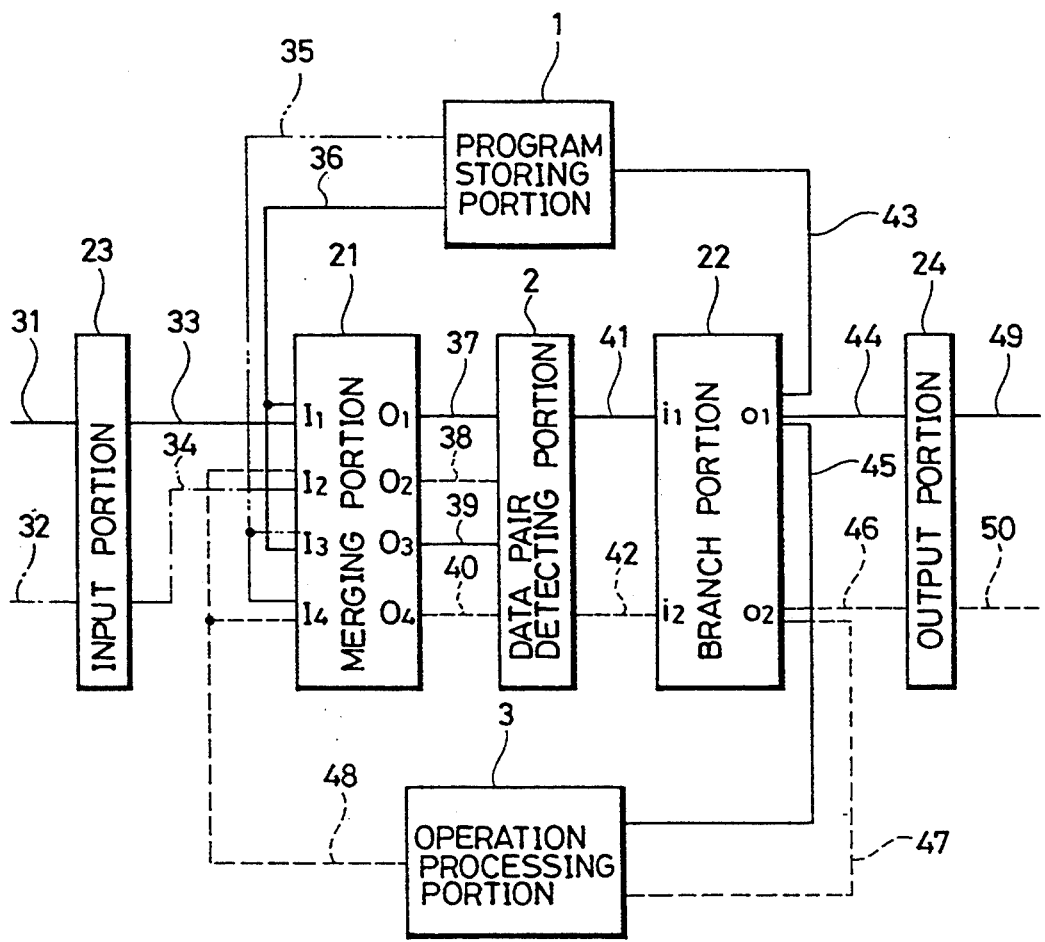
FIG. 1 is a block diagram showing a structure of a data flow type information processor according to one embodiment of the present invention.

The embodiments of the present invention will be described in detail with reference to the drawing in the following.

FIG. 1 is the block diagram showing an arrangement of a data flow type information processor according to one embodiment of the present invention.

In FIG. 1, processings of a program storing portion 1, a data pair detecting portion 2 and an operation processing portion 3 are the same as those of a conventional information processor. In this embodiment, a merging portion 21 is provided at the input side of the data pair detecting portion 2 and a branch portion 22 is provided at the output side of the data pair detecting portion 2.

Further provided are an input portion 23 for externally receiving a data packet and an output portion 24 for externally outputting a data packet. The input portion 23 and the branch portion 22 have packet buffering functions.

Figure 2:
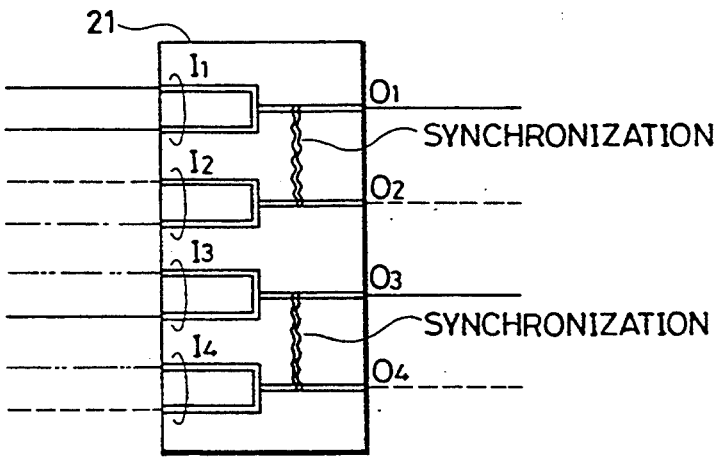
FIG. 2 is a diagram showing a structure of a merging portion included in the processor according to the above-described embodiment.

The merging portion 21 has four input ports I1, I2, I3 and I4 and four output ports O1, O2, O3 and O4 as shown in FIG. 2. The data packets output from the output ports O1 and O2 synchronize with each other. The data packets output from the output ports O3 and O4 synchronize with each other.

Figure 3:
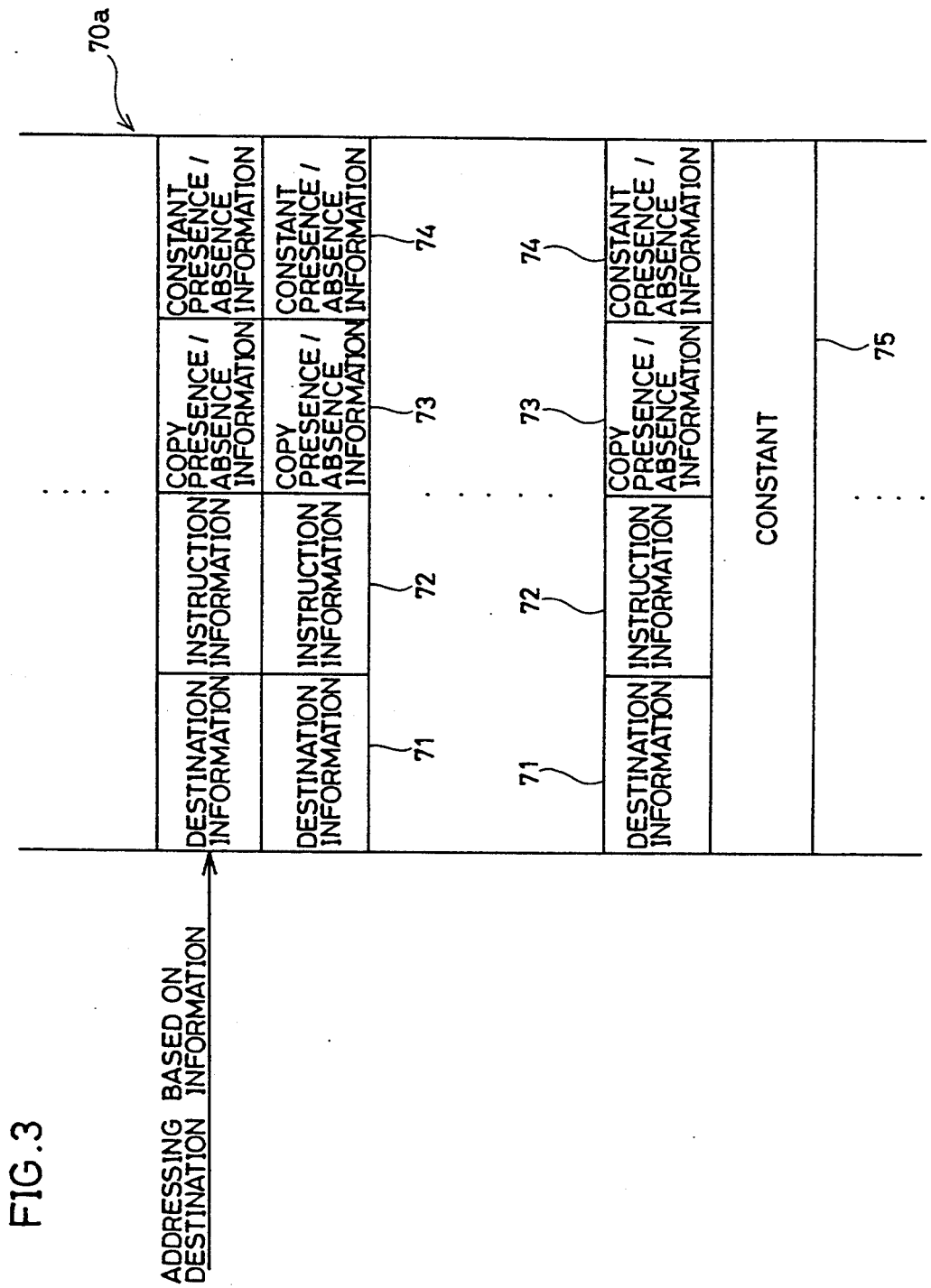
FIG. 3 is a diagram showing data flow program to be processed according to the above-described embodiment.

The program storing portion 1 of FIG. 1 stores data flow program 70a shown in FIG. 3. Each row of the data flow program 70a includes destination information 71, instruction information 72, copy presence/absence information 73 and constant presence/absence information 74. When the constant presence/absence information indicates "presence", the next row stores constant data 75.

Figure 4:
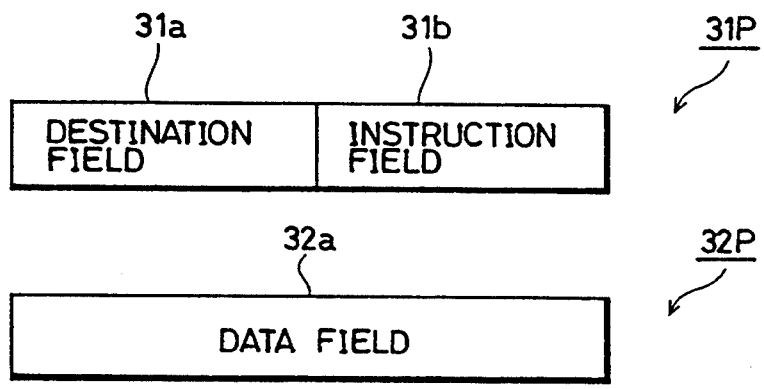
FIGS. 4, 5, 6, 7, 8, 9, 10, 11 and 12 are diagrams showing field arrangements of data packets to be processed according to the above-described embodiment.

Again referring to FIG. 1, data transmission paths 31 and 32 are connected to the two input ports of the input portion 23, respectively. As shown in FIG. 4, the data transmission path 31 is supplied with a data packet 31P including a destination filed 31a and an instruction field 31b. The data transmission path 32 is supplied with a data packet 32P including a data filed 32a, as shown in FIG. 4. The two output ports of the input portion 23 are connected to the input ports I1 and I2 of the merging portion 21 through data transmission paths 33 and 34.

Figure 5:
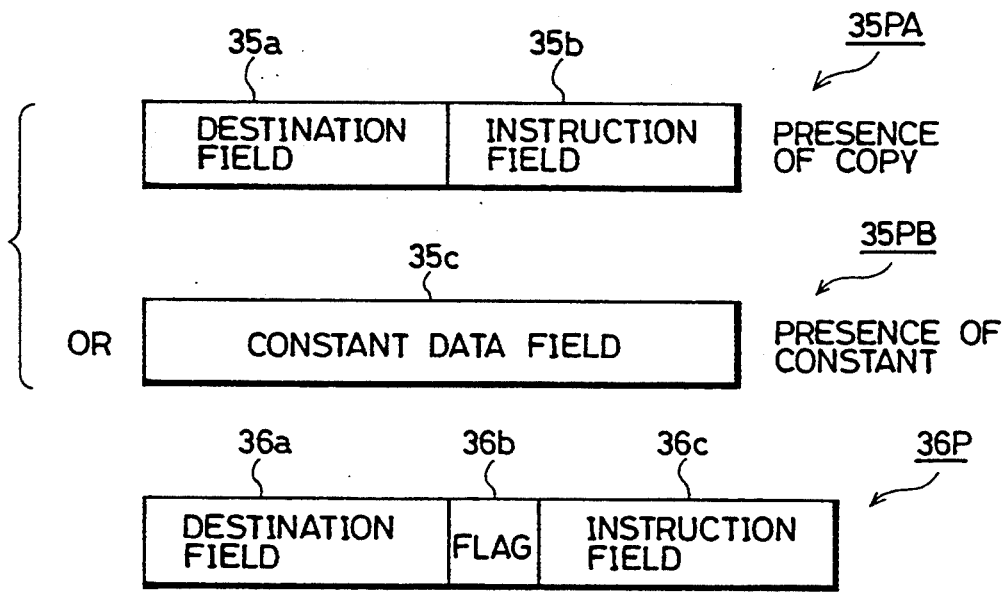

The two output ports of the program storing portion 1 are connected to data transmission paths 35 and 36, respectively. The data transmission path 35 is connected to the input ports I3 and I4 of the merging portion 21 and the data transmission path 36 is connected to the input ports I1 and I3 of the merging portion 21. The data transmission path 35 is supplied with a data packet 35PA including a destination field 35a and an instruction field 35b or a data packet 35PB including a constant data field 35c, as shown in FIG. 5. The data transmission path 36 is supplied with a data packet 36P including a destination field 36a, a flag 36b and an instruction field 36c, as shown in FIG. 5.

Figure 6:
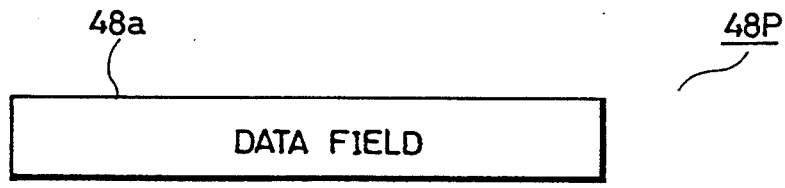

The output port of the operation processing portion 3 is connected to a data transmission path 48. The data transmission path 48 is connected to the input ports I2 and I4 of the merging portion 21. The data transmission path 48 is supplied with a data packet 48P including a data field 48a as shown in FIG. 6.

Figure 7:
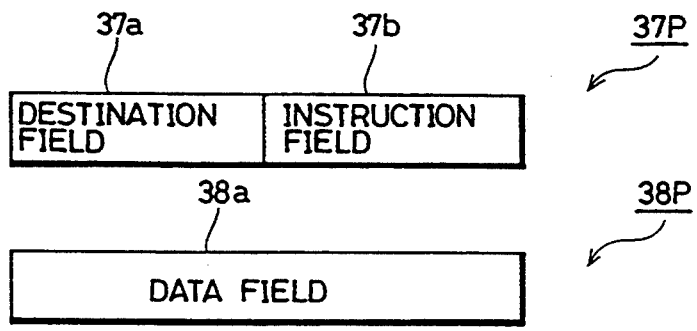
Figure 8:
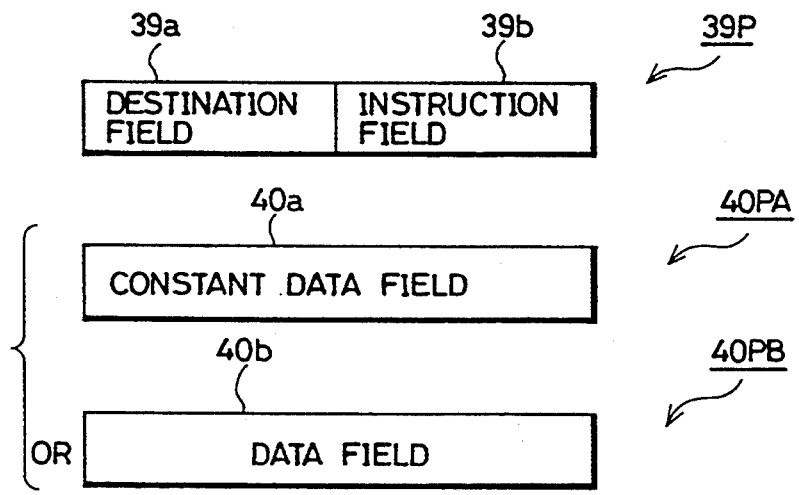

The four output ports O1, O2, O3 and O4 of the merging portion 21 are connected to the four input ports of the data pair detecting portion 2 through data transmission paths 37, 38, 39 and 40. The data transmission path 37 is supplied with a data packet 37P including a destination field 37a and an instruction field 37b as shown in FIG. 7. The data transmission path 38 is supplied with a data packet 38P including a data field 38a as shown in FIG. 7. The data transmission path 39 is supplied with a data packet 39P including a destination field 39a and an instruction field 39b as shown in FIG. 8. The data transmission path 40 is supplied with a data packet 40PA including a constant data field 40a or a data packet 40PB including a data field 40b as shown in FIG. 8.

Figure 9:
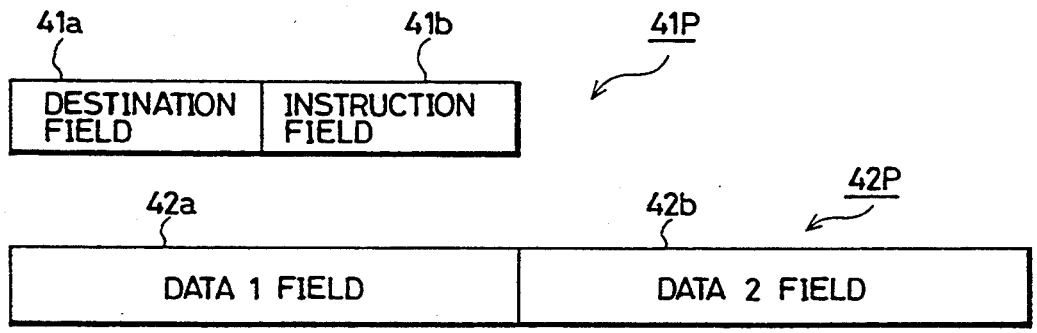

The two output ports of the data pair detecting portion 2 are connected to two input ports i1 and i2 of the branch portion 22 through data transmission paths 41 and 42. The data transmission path 41 is supplied with a data packet 41P including a destination field 41a and an instruction field 41b as shown in FIG. 9. The data transmission path 42 is supplied with a data packet 42P including a data 1 filed 42a and a data 2 field 42b as shown in FIG. 9.

Figure 10:
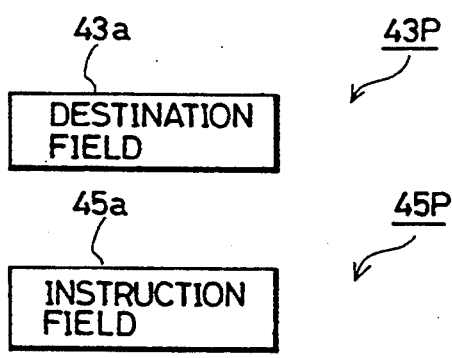
Figure 11:
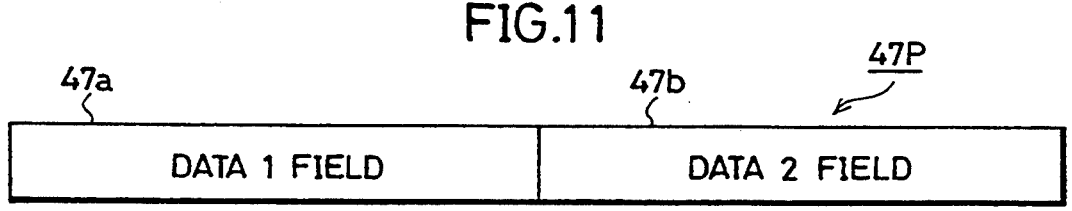

One output port o1 of the branch portion 22 is connected to the input port of the program storing portion 1 through a data transmission path 43, connected to one input port of the output portion 24 through a data transmission path 44 and connected to one input port of the operation processing portion 3 through a data transmission path 45. The other output port o2 of the branch portion 22 is connected to the other input port of the output portion 24 through a data transmission path 46 and connected to the other input port of the operation processing portion 3 through a data transmission path 47. The transmission path 43 is supplied with a data packet 43P including a destination field 43a and the data transmission path 45 is supplied with a data packet 45P including an instruction field 45a as shown in FIG. 10. The data transmission path 47 is supplied with a data packet 47P including a data 1 field 47a and a data 2 field 47b as shown in FIG. 11.

Figure 12:
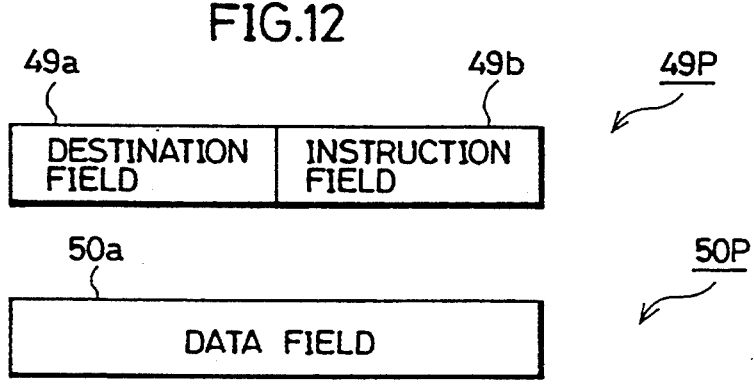

The two output ports of the output portion 24 are connected to data transmission paths 49 and 50, respectively. The data transmission paths 49 is supplied with a data packet 49P including a destination field 49a and an instruction field 49b and the data transmission path 50 is supplied with a data packet 50P including a data field 50a as shown in FIG. 12.

Referring to FIG. 3, the operation of the data flow type information processor according to this embodiment will be described.

First, a pair of data packets 31P and 32P are applied to the input portion 23 as inputs. These data packets 31P and 32P are transmitted to the input ports I1 and I2 of the merging portion 21, respectively. At the first stage, these data packets 31P and 32P are transmitted without being processed as the data packets 37P and 38P from the output ports O1 and O2, respectively, to the data pair detecting portion 2. The above-described operation is repeated. When the data pair detecting portion 2 detects two pairs of data packets having the same destination information, the data pair detecting portion 2 outputs a pair of data packets 41P and 42P.

The branch portion 22 makes a determination as to whether the internal processing with respect to these data packets 41P and 42P should be continued or these data packets 41P and 42P should be transmitted to the output portion 24. When the internal processing is to be continued, the branch portion 22 separates the data packet 41P into the data packet 43P including a destination field and the data packet 45P including an instruction field, and transmits the data packet 43P to the program storing portion 1 and the data packet 45P to the operation processing portion 3. The branch portion 22 also transmits the data packet 42P to the operation processing portion 3 as the data 47P. When the data packets 41P and 42P are transmitted to the output portion 24, the data packet 41P is not separated. The data packet 41P transmitted to the output portion 24 is output as the data packet 49P and the data packet 42P transmitted to the output portion 24 is output as the data 50P.

The operation processing portion 3 executes an operation processing with respect to one or two operand data stored in the data packet 47P based on the instruction information stored in the data packet 45P and outputs only the data indicative of the operation result as the data packet 48P.

Meanwhile, in the program storing portion 1, the subsequent destination information 71, instruction information 72, copy presence/absence information 73 and constant presence/absence information 74 of the data flow program 70a shown in FIG. 3 is read out by addressing based on the destination information stored in the data packet 43P. The data packet 36P is output onto the data transmission path 36, which packet includes the destination information, an instruction information and the flag (copy presence/absence information and constant presence/absence information). When the copy presence/absence information indicates "presence", the data packet 35PA including the destination information and the instruction information in the next address is output onto the data transmission path 35. When the constant presence/absence information indicates "presence", the data packet 35PB including the constant data 75 (see FIG. 3) in the subsequent address is output onto the data transmission path 35. When the copy absence/presence information indicates "absence" and the constant presence/absence information indicates "absence", although the data packet including information in the subsequent address is output onto the data transmission path 35, the data packet is removed in the merging portion 21.

Hereinafter, each data packet circulates in order through the respective processing portions to proceed the processing according to the data flow program 70a.

The merging portion 21 arbitrates between the externally applied data packets and the internally processed data packets. The data packets output from the merging portion 21 are classified into the following fours.

(1) When both the copy presence/absence information and the constant presence/absence information indicate "absence", the data packet 36P is output as the data packet 37P from the output port O1 and the data packet 48P is output as the data packet 38P from the output port O2.

(2) When the copy presence/absence information indicates "presence", the data packet 36P is output as the data packet 37P from the output port O1 and the data packet 48P is output as the data packet 38P from the output port O2. At the same time, the data packet 35PA is output as the data packet 39PA from the output port O3 and the data packet 48P is output as the data packet 40PB from the output port O4.

(3) When the constant presence/absence information indicates "presence", the data packet 36P is output as the data packet 37P from the output port O1 and the data packet 48P is output as the data packet 38P from the output port O2. At the same time, the data packet 36P is output as the data-packet 39PB from the output port O3 and the data pocket 35PB is output as the data packet 40PB from the output port O4.

(4) When the data packets 31P and 32P are externally applied, these data packets 31P and 32P are output as the data packets 37P and 38P from the output ports O1 and O2.

When the internally processed data packet 36P and the externally applied data packet 31P conflict with each other, the internally processed data packet 36P is output from the output port O1 with priority. The data packets which are not given priority are kept waiting until no conflicting party is found.

At the output port O2, when the internally processed data packet 36P is selected at the output port O1, the data packet 48 output from the operation processing portion 3 is selected, and when the externally applied data packet 31P is selected at the output port O1, the externally applied data packet 32P is selected. The data packet 38P is output in synchronization with the data packet 37P. The non-selected data packets are kept waiting.

When both the copy presence/absence information and the constant presence/absence information indicate "absence", nothing is output from the output port O3. When the externally applied data packet 31P is selected at the output port O1, the output from the output port O3 is kept waiting.

When the data packet 35PA is selected at the output port O3, the data pocket 48P is selected at the output port O4. When the data packet 36P is selected at the output port O3, the data packet 35PB is selected at the output port O4. The data packets 40PA and 40PB are output in synchronization with the data pockets 39PB and 39PA.

Unlike the output port O2, a non-selected pair is eliminated out of the data packet pairs of 35PA and 48P, and 36P and 35PB at the output port O4. In addition, when both the copy presence/absence information and the constant presence/absence information indicate "absence", nothing is output from the output port O4. That is, both the above-described two pairs of data packets are eliminated.

With respect to the data packet 42P output from the data pair detecting portion 2, when the corresponding instruction information indicates one input instruction, the operand data is stored only in the data 1 field and when the corresponding instruction information indicates two input instruction, the operand data is stored both in the data 1 field and the data 2 field.

As the foregoing, even when the data packet 36P including the destination information and the instruction information is output simultaneously with the other data packet 35PA or 35PB such as in a copy processing or when a constant is output, the merging portion 21 applies in parallel these data packets to the data pair detecting portion 2. Therefore, it is possible to couple a data packet newly read from the program storing portion 1 with the corresponding data packet processed by the operation processing portion 3 without applying extra identification information to the data packets separated by the branch portion 22.

Figure 14:
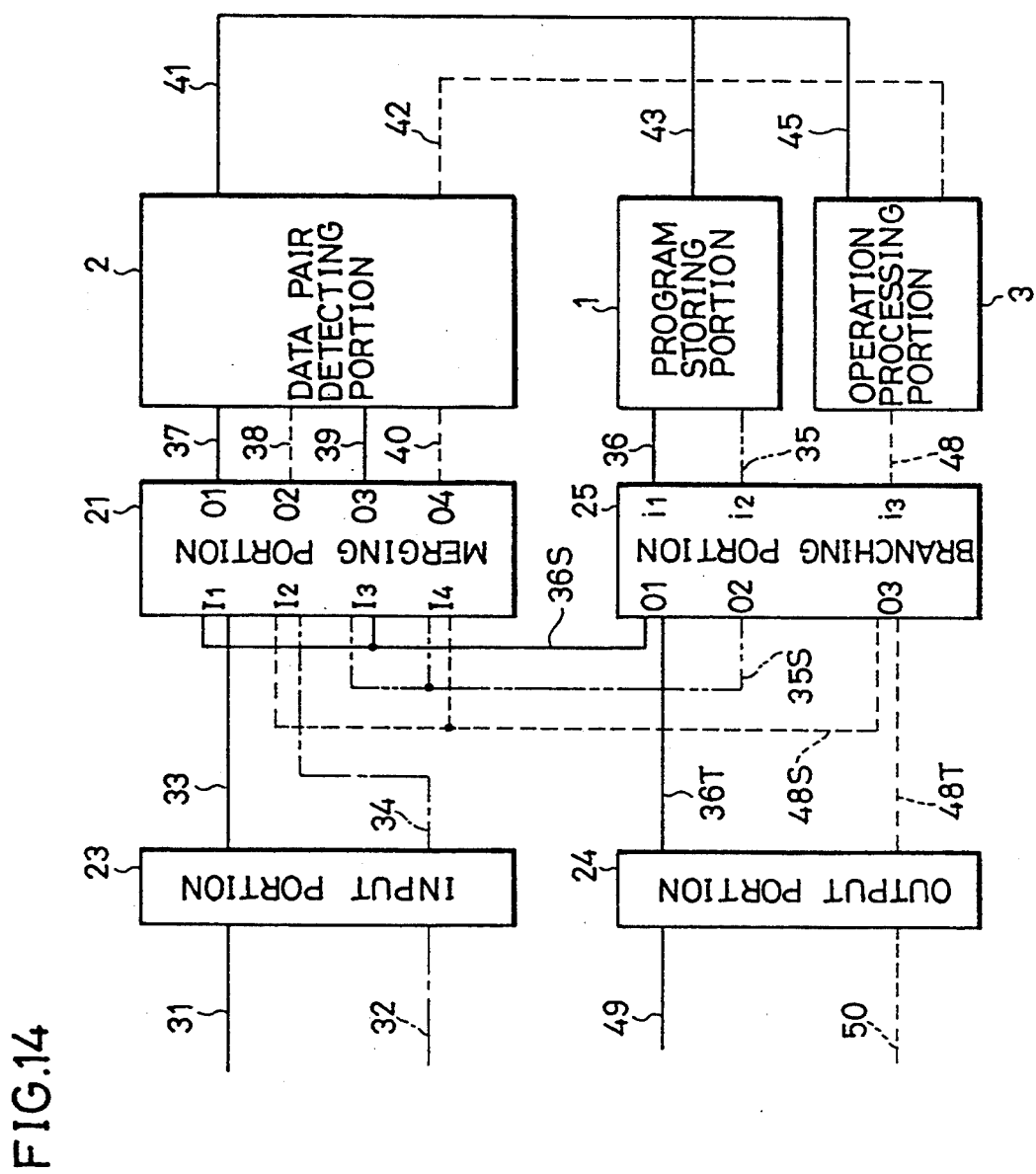
FIG. 14 is a block diagram showing a structure of a data flow type information processor according to another embodiment of the present invention.

FIG. 14 is the block diagram showing the arrangement of the data flow type information processor according to another embodiment of the present invention.

The embodiment shown in FIG. 14 differs from that of FIG. 1 in the following respects. In the embodiment of FIG. 14, the branch portion 22 is not provided at the output side of the data pair detecting portion 2 but a branch portion 25 is provided at the output side of the program storing portion 1 and the operation processing portion 3. In addition, the output portion 24 is provided at the output side of the branch portion 25. Like the branch portion 22 of FIG. 1, the branch portion 25 has a packet buffering function.

The arrangements and the operations of the input portion 23, the merging portion 21 and the data pair detecting portion 2 are the same as those of the input 23, the merging portion 21 and the data pair detecting portion 2 shown in FIG. 1.

The data transmission path 41 is connected to one output port of the data pair detecting portion 2. The data transmission path 41 is branched into the data transmission path 43 and the data transmission path 45, the data transmission path 43 being connected to the input port of the program storing portion 1 and the data transmission path 45 being connected to one input port of the operation processing portion 3. The data packet 41P applied onto the data transmission path 41 is separated into the data packet 43P and the data packet 45P. The data packet 43P is applied onto the data transmission path 43 and the data packet 45P is applied onto the data transmission path 45.

The other output port of the data pair detecting portion 2 is connected to the other input port of the operation processing portion 3 through the data transmission path 42. The data transmission path 42 is supplied with the data packet 42P.

The arrangements and the operations of the program storing portion 1 and the operation processing portion 3 are the same as those of the program storing portion 1 and the operation processing portion 3 shown in FIG. 1.

The two output ports of the program storing portion 1 are connected to two input ports i1 and i2 of the branch portion 25 through the data transmission paths 36 and 35, respectively. The data transmission path 36 is supplied with the data packet 36P. The data transmission path 35 is supplied with the data packet 35PA or the data packet 35PB.

The output port of the operation processing portion 3 is connected to an input port i3 of the branch portion 25 through the data transmission path 48. The data transmission path 48 is supplied with the data packet 48P.

An output port o1 of the branch portion 25 is connected to data transmission paths 36S and 36T. The data transmission path 36S is connected to the input ports I1 and I3 of the merging portion 21 and the data transmission path 36T is connected to one input port of the output portion 24. An output port o2 of the branch portion 25 is connected to the data transmission path 35S. The data transmission path 35S is connected to the input ports I3 and I4 of the merging portion 21. An output port o3 of the branch portion 25 is connected to data transmission paths 48S and 48T. The data transmission path 48S is connected to the input ports I2 and I4 of the merging portion 21 and the data transmission path 48T is connected to the other input port of the output portion 24.

The arrangement and the operation of the output portion 24 are the same as those of the output portion 24 shown in FIG. 1.

Figure 15:
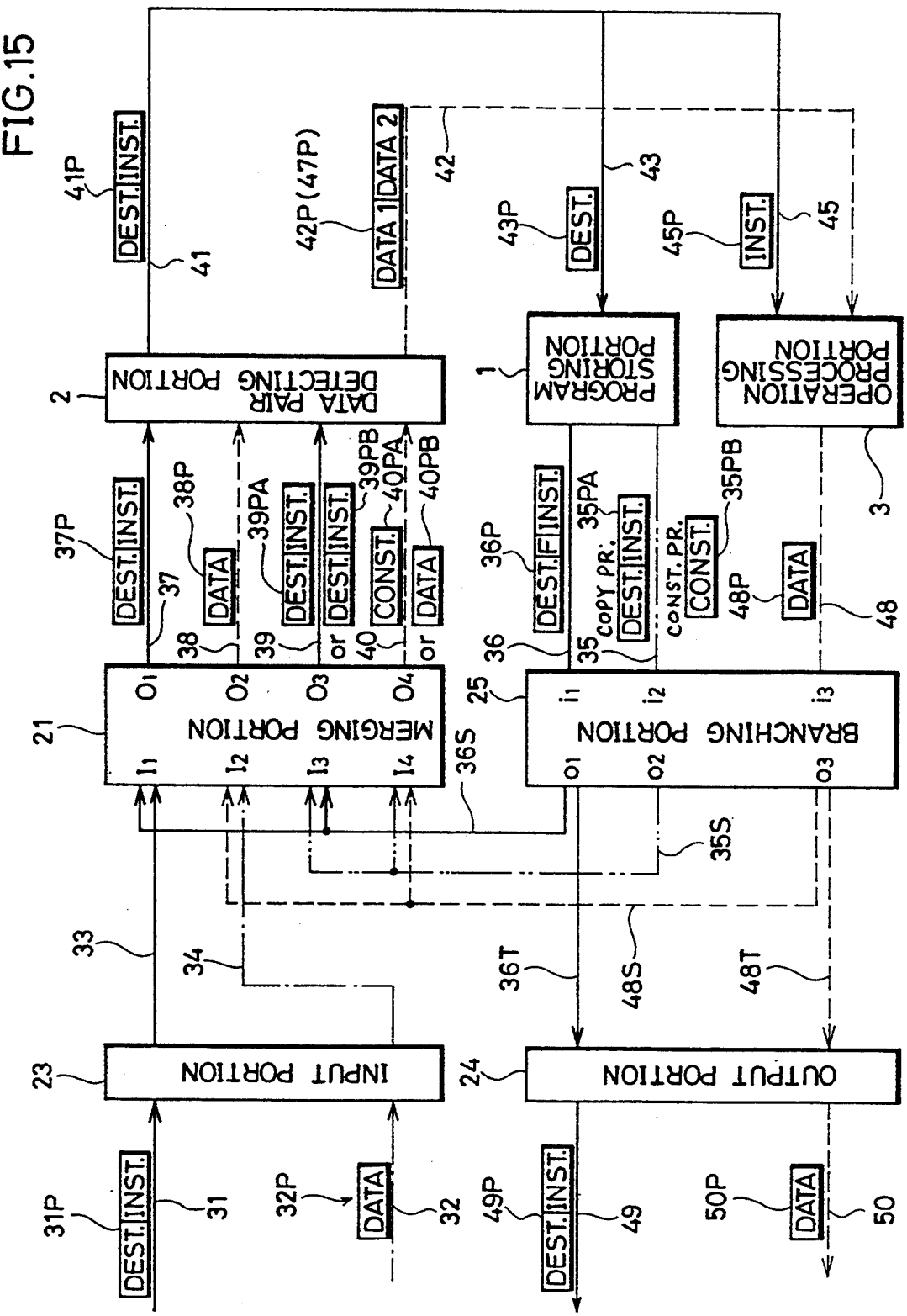
FIG. 15 is diagram explaining an operation of this embodiment.
Figure 16:
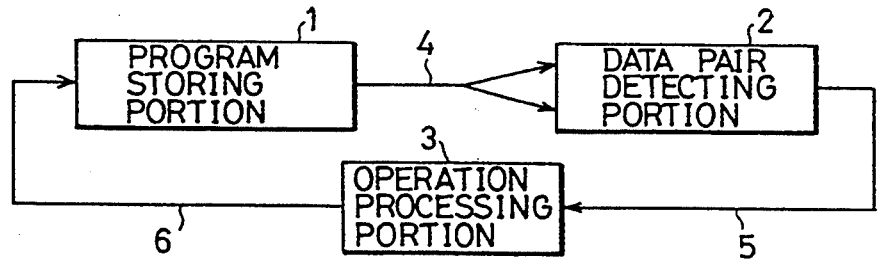
FIG. 16 is a diagram showing one example of a structure of a conventional data flow type information processor.
Figure 17:
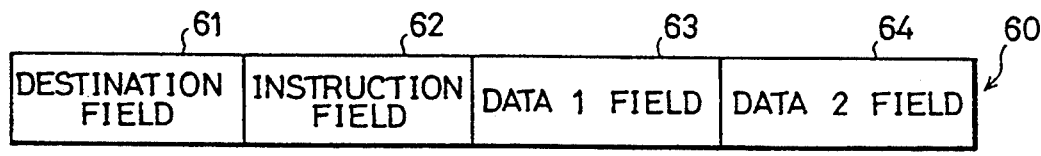
FIG. 17 is a diagram showing a field arrangement of a data packet to be processed in a data flow type information professor.
Figure 18:
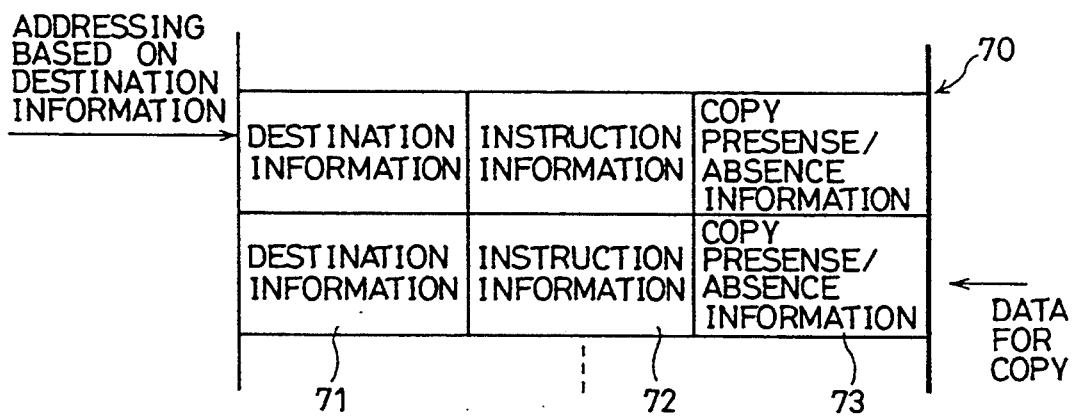
FIG. 18 is a diagram showing a part of data flow program stored in a program storing portion of the data flow type inflation processor.
Figure 19:
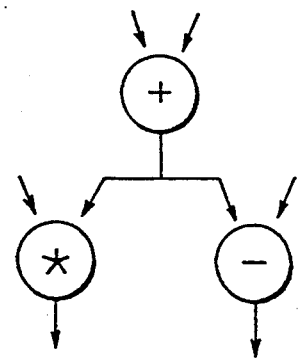
FIG. 19 is a diagram showing a part of the data flow program including a copy processing.
Figure 20:
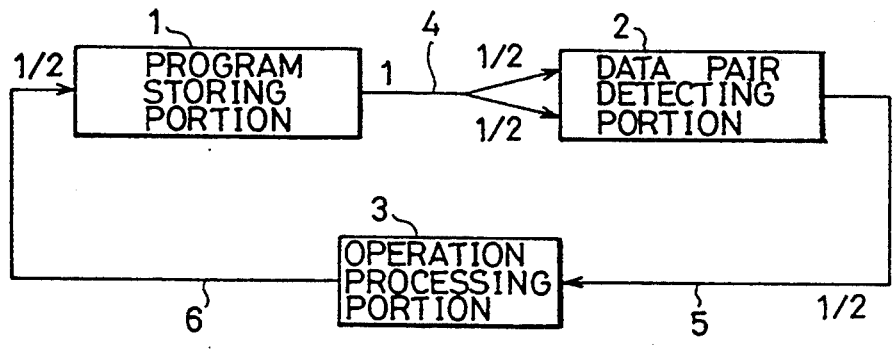
FIG. 20 is a diagram showing a flow rate of data packets on each data transmission path of the information processor shown in FIG. 16.
Figure 21:
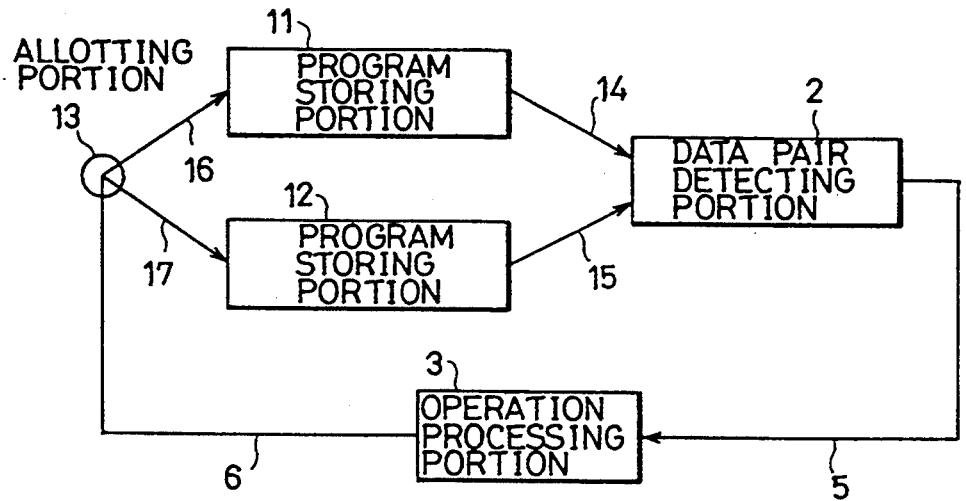
FIG. 21 a diagram showing another example of the arrangement of the conventional data flow type information processor.
Figure 22:
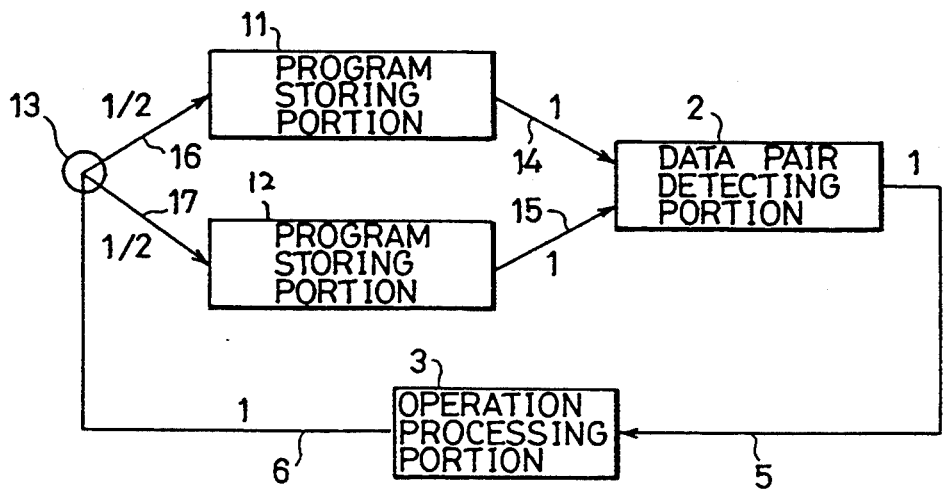
FIG. 22 is a diagram showing a flow rate of the data packets on each data transmission path of the information processor shown in FIG. 21.

Referring to FIG. 15, the operation of the data flow type information processor according to the embodiment shown in FIG. 14 will be described.

Figure 13:
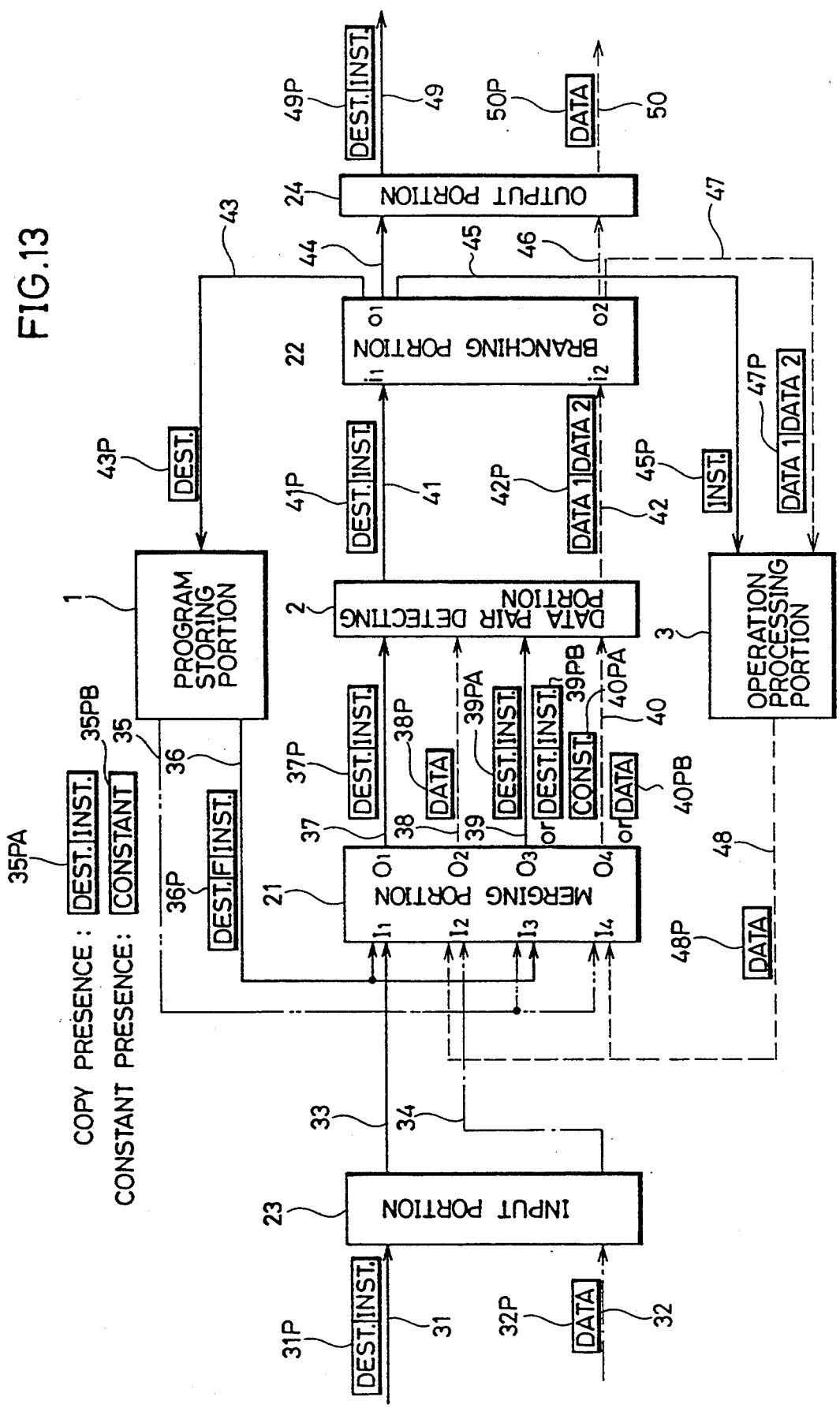
FIG. 13 is a diagram explaining an operation of the above-described embodiment.

The operations from the first input of one pair of data packets 31P and 32P to the input portion 23 until the output of one pair of data packets 41P and 42P from the data pair detecting portion 2 are the same as those described with reference to FIG. 13.

The data packet 41P output from the data pair detecting portion 2 is separated into the data packet 43P and the data packet 45P, and then, the data packet 43P is applied to the program storing portion 1 and the data packet 45P is applied to the operation processing portion 3. The data packet 42P output from the data pair detecting portion 2 is applied to the operation processing portion 3 without modification.

The operations of the program storing portion 1 and the operation processing portion 3 are the same as those described with reference to FIG. 13. The data packet 36P is output onto the data transmission path 36 and the data packet 48P is output onto the data transmission path 48. In this case, when the copy presence/absence information indicates "presence", the data packet 35PA is output onto the data transmission path 35. When the constant presence/absence information indicates "presence", the data packet 35PB is output onto the data transmission path 35. When the copy presence/absence information and the constant presence/absence information indicate "absence", nothing is output onto the data transmission path 35.

The branch portion 25 makes a determination as to whether the internal processing with respect to these data packets 36P and 48P should be continued or these data packets 36P and 48P should be transmitted to the output portion 24. When the determination is made to continue the internal processing, the branch portion 25 transmits the data packets 36P and 48P to the input ports I1 and I2 of the merging portion 21, respectively. The data packets 36P and 48P transmitted to the output portion 24 are externally applied as the data packets 49P and 50P, respectively, from the output portion 24.

In principle, the data packets 31P and 32P are paired with each other and are input to the input portion 23 simultaneously. Similarly, the data packets 49P and 50P are paired with each other and output simultaneously from the output portion 24.

Also in the embodiment of FIG. 15, even when the data packet 36P including the destination information and the instruction information is output simultaneously with the other data packet 35PA or 35PB such as in a copying processing or when a constant is output, the merging portion 21 applies in parallel these data pockets to the data pair detecting portion 2. It is therefore possible to couple a data packet newly read from the program storing portion 1 with the corresponding data packet processed by the operation processing portion 3 without applying extra identification information to the data packets separately output from the data pair detecting portion 2.

In the embodiments shown in FIGS. 1 and 14, since data packets including only the information required for each processing portion are transmitted, data lines constituting a data transmission path for transmitting data packets can be reduced in width.

While the program storing portion 1 of the embodiment shown in FIG. 1 is ordinarily provided outside the information processor and that of the embodiment shown in FIG. 14 is provided inside the information processor, a provision is not limited thereto and the program storing portion 1 of the embodiment shown in FIG. 1 can be provided inside the information processor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data flow information processor for performing information processing in accordance with a data flow program, including a plurality of pairs of destination information and instruction information, comprising:
  program storing means for storing and reading at least destination information and instruction information from said data flow program based on input destination information, said program storing means having two output ports each operatively connected to two distinct data transmission paths, operation processing means for performing an operation processing with respect to input data based on said input instruction information and outputting data indicative of an operation result, merging portion for merging said pairs of destination information and instruction information read from said program storing means with the data output from said operation processing means, said merging portion having eight input ports, a first two of said input ports connected to one of said two distinct data transmission paths and a second two of said input ports connected to another of said two distinct data transmission paths said operation processing means operatively connected to a third two of said input ports of said merging portion the merging portion including four output ports, data pair detecting means including input ports and output ports for receiving said pairs of destination information and instruction information output from said merging means together with the data corresponding to the destination and instruction information to output data corresponding to the destination information and the instruction information, and supplying means for supplying the destination information out of the output ports from said data pair detecting means to said program storing means and applying the instruction information and the data out of the output ports to said operation processing means, and said merging portion, when other information is simultaneously read with said pairs of destination information and instruction information from said program storing means, applying said other information to said data pair detecting means in parallel with said destination information and instruction information, so that two pairs of data packets are processed at the same time in a copying operation.

2. The information processor according to claim 1, wherein said supplying means includes branching means for selectively outputting the destination information out of the outputs from said data pair detecting means to said program storing means or to the outside and for selectively outputting the instruction information and the data out of the outputs to said operation processing means or to the outside.

3. The information processor according to claim 1, further comprising branching means for selectively outputting said destination information and instruction information read out from said program storing means and said data output from said operation processing means to said merging means or to the outside, wherein said supplying means includes transmitting means for applying the destination information out of the outputs from said data pair detecting means to said program storing means and applying the instruction information and the data out of the outputs to said operation processing means.

4. The information processor according to claim 1, wherein said data flow program includes information indicative of a copy processing, and said program storing means, when said information indicative of a copy processing is read out together with said destination information and instruction information, reads out further destination information and instruction information together with said destination information and instruction information.

5. The information processor according to claim 4, wherein said data flow program further includes information identifying a constant reading processing and a constant said program storing means, when said information identifies a constant reading processing is read together with said destination information and instruction information, reads out said constant together with said destination information and instruction information.

6. The information processor according to claim 5, wherein said merging means includes:

a first input including two ports for receiving destination information and instruction information applied from said program storing means and externally applied destination information and instruction information, a second input including two ports for receiving the data applied from said operation processing means and externally applied data, a third input including two ports for receiving said destination information and instruction information applied from said program storing means in a copying processing and receiving said destination information and instruction information applied from said program storing means in constant reading processing, a fourth input including two ports for receiving said data applied from said operation processing means in a copy processing and receiving said constant applied from said program storing means in a constant reading processing, a first output port for outputting the destination information and the instruction information input from said first input including two ports, a second output port for outputting the data input from said second input including two ports, a third output port for outputting the destination information and the instruction information input from said third input including two ports in a copy processing and a constant reading processing, and a fourth output port for outputting the data input from said fourth input including two ports in a copy processing and outputting the constant input from said fourth input including two ports in a constant reading processing, so that two pairs of data packets are processed at the same time in a copying operation.

7. The information processor according to claim 1, wherein said data flow program includes information designating a constant reading processing and a constant, said program storing means, when said information designating a constant reading processing is read together with said destination information and instruction information, reads out said constant together with said destination information and instruction information.

8. The data flow information processor according to claim 1, wherein the two pairs of data packets include four distinct parts each part emitted from each output port respectively at the same time.

9. The data flow information processor according to claim 8, wherein the two distinct parts form one of said pair which are emitted from two adjacent output ports and includes one part that contains data from a data packet emitted from the program storing means and the other distinct part contains information from the operation processing portion.

10. The data flow information processor according to claim 9, wherein another two distinct parts form the other of said two pairs and includes one distinct part including distinct data from said program storing portion and a second distinct part including information from said operation processing portion with the two distinct parts forming the other of said pairs being emitted separately from two adjacent output ports.

11. An information processor for processing data packets in accordance with a data flow program including a plurality of pairs of destination information and instruction information, comprising:

program storing means for storing said data flow program, receiving a first data packet including destination information, reading subsequent destination information and instruction information from said data flow program by addressing based on the destination information in said first data packet to output a second data packet including the read out destination information and instruction information, operation processing means for receiving a third data packet including instruction information and a fourth data packet including data and for performing an operation processing with respect to the data in said fourth data packet based on the instruction information in said third data packet to output a fifth data packet including data indicative of the operation result, merging means for merging the second data packet output from said program storing means with the fifth data packet output from said operation processing means, data pair detecting means for receiving the output from said merging means and detecting two second data packets having identical destination information to output a sixth data packet including the destination information and the instruction information in one of the second data packets, and a seventh data packet including the data in the fifth data packet corresponding to these two second data packets, and supplying means for separating the destination information and the instruction information from each other included in said sixth data packet out of the outputs from said data pair detecting means, applying the data packet including the destination information as a first data packet to said program storing means, applying the data packet including the instruction information as a third data packet to said operation processing means, and applying said seventh data packet as fourth data packet to said operation processing means, said merging means, when an eighth data packet including other information is simultaneously read from said program storing means together with said second data packet in a predetermined processing, applying said eight data packet to said data pair detecting means in parallel with said second data packet, so that two pairs of data packets are processed in a copying operation.

12. An operating method of a data flow type information processor which comprises:

program storing means for storing and reading at least destination information and instruction information from a data flow program based on input destination information; operation processing means for performing an operation processing with respect to input data based on input instruction information to output data indicative of an operation; result; merging means for merging destination information and instruction information read out from said program storing means with the data output from said operation processing means; and data pair detecting means including inputs for receiving the destination information and the instruction information output from said merging means together with the data corresponding to those information and outputs to output one or a plurality of data corresponding to the same destination information together with the destination information and the instruction information, the method comprising the steps of:

applying destination information to said program storing means out of the outputs from said data pair detecting means and applying instruction information and the data out of said outputs to said operation processing means, and when other information is simultaneously read out from said program storing means together with said destination information and instruction information in a predetermined processing, supplying said other information to said data pair detecting means in parallel with said destination information and instruction information so that pairs of data packets are processed at the same time in a copying operation.

13. The method according to claim 12, wherein said step of supplying comprises selectively outputting destination information out of the outputs from said data pair detecting means to said program storing means or to the outside and selectively outputting instruction information and the data out of the outputs to said operation processing means or to the outside.

14. The method according to claim 12 further comprising selectively outputting destination information and instruction information read out from said program storing means and the data output from said operation processing means to said merging means or to the outside.

* * * * *